US 6,715,317 B1

(12) United States Patent
Bräuer et al.

(10) Patent No.: US 6,715,317 B1
(45) Date of Patent: Apr. 6, 2004

(54) PROCESS AND APPARATUS FOR THE PRODUCTION OF A CYLINDRICAL COMPONENT OF GLASS

(75) Inventors: Karsten Bräuer, Bruchköbel (DE); Frank Gänsicke, Geiselbach (DE); Helmut Friedrich, Dieburg (DE); Heinz Fabian, Freigericht (DE)

(73) Assignee: Heraeus Tenevo AG, Hanau (DE)

( * ) Notice: Subject to any disclaimer, the term of this patent is extended or adjusted under 35 U.S.C. 154(b) by 0 days.

(21) Appl. No.: 08/897,713

(22) Filed: Jul. 21, 1997

(30) Foreign Application Priority Data

Jul. 19, 1996 (DE) .......................................... 196 29 169

(51) Int. Cl.[7] ............................................. C03B 23/047
(52) U.S. Cl. ........................... 65/29.14; 65/103; 65/158; 65/162; 65/382; 65/401
(58) Field of Search .......................... 65/381, 382, 491, 65/392, 403, 437, 481, 477, 475, 508, 510, 511, 513, 514, 537, 534, 384, 488, 486, 485, 378, 29.14, 64, 102, 103, 158, 162, 271, 292, 351, 348

(56) References Cited

U.S. PATENT DOCUMENTS 3,652,248 A * 3/1972 Loxley et al.
3,879,182 A * 4/1975 Strack
4,123,242 A * 10/1978 Imoto et al.
4,793,840 A * 12/1988 Harding
5,073,179 A * 12/1991 Yoshimura et al.
5,079,433 A * 1/1992 Smith

FOREIGN PATENT DOCUMENTS

DE 19536960 10/1995

* cited by examiner

Primary Examiner—Sean Vincent
(74) Attorney, Agent, or Firm—Milde & Hoffberg LLP

(57) ABSTRACT

A glass composition to be softened is fed to a heating zone and is shaped continuously into a cylindrical component in a deformation zone, and the cross-sectional geometry of the component is determined. A feed device, a heating device, and a take-off device are provided, and a glass composition is supplied continuously by the feed device to the heating device, where it is softened, the component being formed from the softened glass composition by means of the take-off device under formation of a deformation zone. To produce a component with only slight deviations from the desired cross-sectional geometry and to provide a flexible apparatus suitable for this purpose, the glass composition is locally heated or cooled in at least one deformation area, which extends over only a part of the circumference of the deformation zone, as a function of a determined deviation of the cross-sectional geometry from a nominal geometry. Heating or cooling are provided, which act locally on at least one deformation area, which extends over only a part of the circumference of the deformation zone.

16 Claims, 4 Drawing Sheets

PROCESS AND APPARATUS FOR THE PRODUCTION OF A CYLINDRICAL COMPONENT OF GLASS

BACKGROUND OF THE INVENTION

The invention pertains to a process for the production of a cylindrical component of glass by feeding a glass composition to a heating zone, by softening the glass composition in the heating zone, by continuously deforming the softened glass composition into the component under creation of a deformation zone within which the softened glass composition is plastically deform able, and by determining the cross-sectional geometry of the component.

The invention also pertains to an apparatus for implementing the process with a feed device, a heating device, and a take-off device, where the feed device continuously supplies a glass composition to the heating device, in which the glass composition is softened, and where the component is formed from the softened glass composition by means of the take-off device under creation of a deformation zone.

A process and an apparatus of the general type in question are described in DE-A1 195 36 960. A vertically oriented, tubular starting cylinder of quartz glass is supplied continuously by a feed device to a furnace, in which it is heated and softened zone by zone, starting from the bottom end. By the use of a take-off device, a tube is pulled off from the softened zone, the diameter of this tube being smaller than that of the starting cylinder.

When the quartz glass tube is drawn, a so-called "drawing bulb" is formed between the starting cylinder and the tube. In the area of the drawing bulb, the quartz glass is plastically deformable. The lower end of the drawing bulb has the same cross-sectional dimension as that of the tube, except for a small difference caused essentially by the thermal expansion of the quartz glass.

The outside diameter of the tube is measured below the drawing bulb. This measurement value is used to control the drawing parameters such as the furnace temperature and the drawing speed.

To prevent deviations in the geometry of the tube and to ensure the dimensional accuracy of the drawn-off tube, it is necessary in the known apparatus to maintain, in the area of the drawing bulb, the most homogeneous possible temperature field, which, in the ideal case, is radially symmetric around the longitudinal axis of the tube. When there are problems with the homogeneity of the temperature field, such as those which can be caused by, for example, measurement devices in the furnace area or maladjustments of the longitudinal axis of the tube with respect to the axis of symmetry of the temperature field, deviations from the ideal tube geometry are the unavoidable result. In particular, oval deformations are observed in practice in the case of tubes and rods which are circular in cross section. These deviations from the desired cross-sectional geometry of the component have an interfering effect on the subsequent steps of processing, so that these components must be discarded or must be subjected to expensive reprocessing to make them conform to nominal dimensions. Therefore, an attempt is usually made to ensure the most radially symmetric, homogeneous possible temperature field in the area of the drawing bulb by means of complicated and expensive furnace designs.

SUMMARY OF THE INVENTION

The invention is therefore based on the task of providing a simple and cost-effective process which makes it possible to obtain a component with only slight deviations from the desired cross-sectional geometry and to make available a suitable and flexible apparatus for achieving this end.

With respect to the process according to the invention, the softened glass composition is locally heated or cooled in at least one deformation area, which extends over only a part of the circumference of the deformation zone, as a function of a determined deviation of the cross-sectional geometry from a nominal geometry of the component.

By heating or cooling in the deformation zone, the viscosity of the glass is changed, and thus a controlled effect is exerted on the plastic deformation of the glass composition in the deformation zone. In the process according to the invention, the change in the viscosity and thus also the deformation of the glass composition differ from area to area as we proceed around the circumference of the deformation zone. This is achieved by heating or cooling a deformation area which extends over only a part of the circumference of the deformation zone.

The term "deformation zone" is understood to mean the zone in which the glass composition is plastically deformable and in which, through cooling or heating, the geometry of the component can be influenced. In processes in which the component is drawn from the glass composition, the deformation zone takes on the form of a drawing bulb. In processes in which the component is formed by thickening the glass composition in the deformation zone, the deformation zone can assume some other shape.

In a cross section perpendicular to the axis of the cylindrical component, the deformation area, at least one of which is present, extends over only a part of the circumference of the deformation zone. In the case of a deformation zone with a circular cross section, for example, the deformation area corresponds to an arc of a circle. By exerting local effects on the viscosity in the deformation area, the process according to the invention makes it possible to correct the cross-sectional geometry of the component without the need for tools.

It is also possible for several deformation areas to be distributed around the circumference of the deformation zone, but in any case, as a result of the cooling or heating in the deformation area overall, the viscosity of the glass composition is affected in different ways as we pass around the circumference of the cross section in the deformation zone. It must be remembered that producing a change in viscosity in even a single point in the deformation area will obviously also have an effect on adjacent parts of the deformation zone, although these effects will be obviously be weaker there. It is therefore impossible to precisely define or easily to detect optically a boundary around the deformation area or areas.

The deviation of the cross-sectional geometry from the nominal geometry of the component can be determined while the component is being formed from the softened glass composition. In this case, it is possible for the deviations which have been found to be taken directly into account during the further course of production. But is also possible to achieve the desired cross-sectional geometry by the use of the process according to the invention only after the component has been produced and after the deviations in its cross-sectional geometry have been determined, in which case the glass composition of the component must be softened again. No mechanical reprocessing of the component is required in either procedure.

The deviation of the cross-sectional geometry from the nominal geometry of the component can be determined by direct measurement of the component's geometry outside the deformation zone, but it can also be determined by measuring a suitable dimension in the deformation zone, if this dimension can be correlated with the component's final geometry.

The essential point is that, in the process according to the invention, the requirements on the homogeneity of the temperature profile in the heating zone are relatively low. Unwanted viscosity changes caused by disturbances of the temperature profile in this zone can be easily compensated. Thus, under the assumption that such disturbances will inevitably occur, it is possible to use relatively simple and low-cost heating systems to soften the glass composition without being forced to accept any loss of the component's dimensional accuracy.

The process according to the invention is independent of the concrete form of the cross section of the component. It is suitable, for example, for the production of tubes, rods, or fibers.

A procedure is preferred in which a stream of gas is directed against the glass composition in the deformation area. The glass composition is thus cooled in the deformation area, and the viscosity is thus locally increased. As a results the cross-sectional form of the glass composition in the deformation zone is changed. A gas stream directed against the deformation area responds very quickly to control measures and can be set up relatively easily.

As an alternative to cooling, the glass composition can be locally heated in the deformation area to achieve a suitable shaping effect. Procedures in which the glass composition is heated by electrical heating elements, by means of a flame, or by means of a laser bean have all proven to be reliable.

In an additional advantageous process variant, the glass composition in the deformation area is shielded by heat shields. Heat shields, which are easy to position, exert a cooling effect in the deformation area by preventing the thermal radiation coming from the hot furnace walls from reaching the deformation area.

A procedure in which the deformation zone is locally heated or cooled in two opposite deformation areas has proven to be especially reliable. This procedure is especially suitable for eliminating or reducing ovality in components with a circular or ring-shaped cross section. In the case that the deformation areas are to be cooled, these areas are located on extensions of the major axis of the oval; in the case that deformation areas are to be heated, they are located on the axis perpendicular to that.

It is advantageous for the deformation area to be moved around the circumference of the deformation zone as a function of the change over time detected in the cross-sectional geometry of the component. This procedure is especially to be preferred when the component geometry is monitored and corrected during the production process itself and when, in the course thereof, changes are expected in the geometry of the component.

It has turned out to be especially effective to determine the size and the form of the geometric deviation from the nominal geometry of the component and to use this information as a basis for the automatic control of the local heating or local cooling in the deformation area. The determined size of the deviation is used as a basis for the automatic control of the intensity of the heating or cooling of the deformation area, whereas the determined form of the deviation is use as a basis for the proper positioning of the deformation area.

To produce a component with a circular or ring-shaped cross section, a procedure is preferred in which the diameter of the component is measured around its circumference, and the size and the location of the circular or ring-shaped deviation are determined from the maximum and minimum measurement values, the size being used for the quantitative control of the heating or cooling in the deformation area, the location being used for the control of the positioning of the deformation area. The maximum and the minimum diameters are determined by measuring the diameter around the entire circumference of the component; from these values, it is then possible to derive the size and location of any out-of-round deviations, especially an ovality. The size of the ovality affects the intensity of the cooling or heating of the glass composition in the deformation area. The location of the ovality deter mines the position of the deformation area or areas.

A procedure in which a strand with a circular cross section is pulled from the softened glass composition, during which a deformation zone in the form of a drawing bulb, which tapers down in the drawing direction, is formed, has proven to be especially effective.

The apparatus in accordance with the invention is provided with heating and/or cooling means, which act locally on at least one deformation area, which extends over only a part of the circumference of the deformation zone.

As already explained in the description of the process according to the invention, the viscosity of the glass composition in the deformation area is locally affected by the heating and/or cooling means. The heating and/or cooling means act on the deformation area; to this end, they can also be a certain distance away from it.

In a preferred embodiment, the cooling means consist of a gas nozzle. A stream of gas emerging from the gas nozzle acts on the deformation area. Gas nozzles of this type can be managed and installed very easily.

In another preferred embodiment of the apparatus, the heating means can comprise either an electric heating element, a burner, or a laser.

An apparatus in which the cooling means consist of a heat shield is especially easy to design.

It is advantageous for the heating and/or cooling means to be designed as a pair of opposing elements. A device such as this is especially suitable for eliminating ovalities of components with a circular or ring-shaped cross section. It is has been found to be especially reliable for the cooling means to be designed as a pair of opposing gas nozzles.

Alternatively, the cooling means can consist of a ring of nozzles arranged around the circumference of the deformation zone, in which the individual nozzles are designed for different gas throughputs. The gas through puts through the individual nozzles can be adjusted as a function of the size and location of the determined deviation of the component from the nominal geometry.

An apparatus in which the heating or cooling means are installed inside the heating device can be designed very simply.

Especially with the goal in mind of obtaining an apparatus with a high degree of flexibility, it has been found to be advantageous for the heating and/or cooling means to be movable in the direction of the longitudinal axis of the component and to be adjustable in the circumferential direction around the deformation zone. As a result of this movability, the position of the deformation area can be changed in the axial direction. Thus it is possible to change easily the intensity of the cooling or heating in the deformation zone. The adjustability in the circumferential direction makes it possible to adapt the location of the deformation area to changes in the position or form of a deviation of the component cross section from its nominal geometry. An embodiment of the apparatus is preferred in which the heating and/or cooling means are connected to an automatic control device, and in which the means in question are moved or adjusted as a function of an automatic control signal transmitted by the control device.

Exemplary embodiments of the invention are shown in the drawing and explained in greater detail below.

DETAILED DESCRIPTION OF THE PREFERRED EMBODIMENTS

Figure 1:
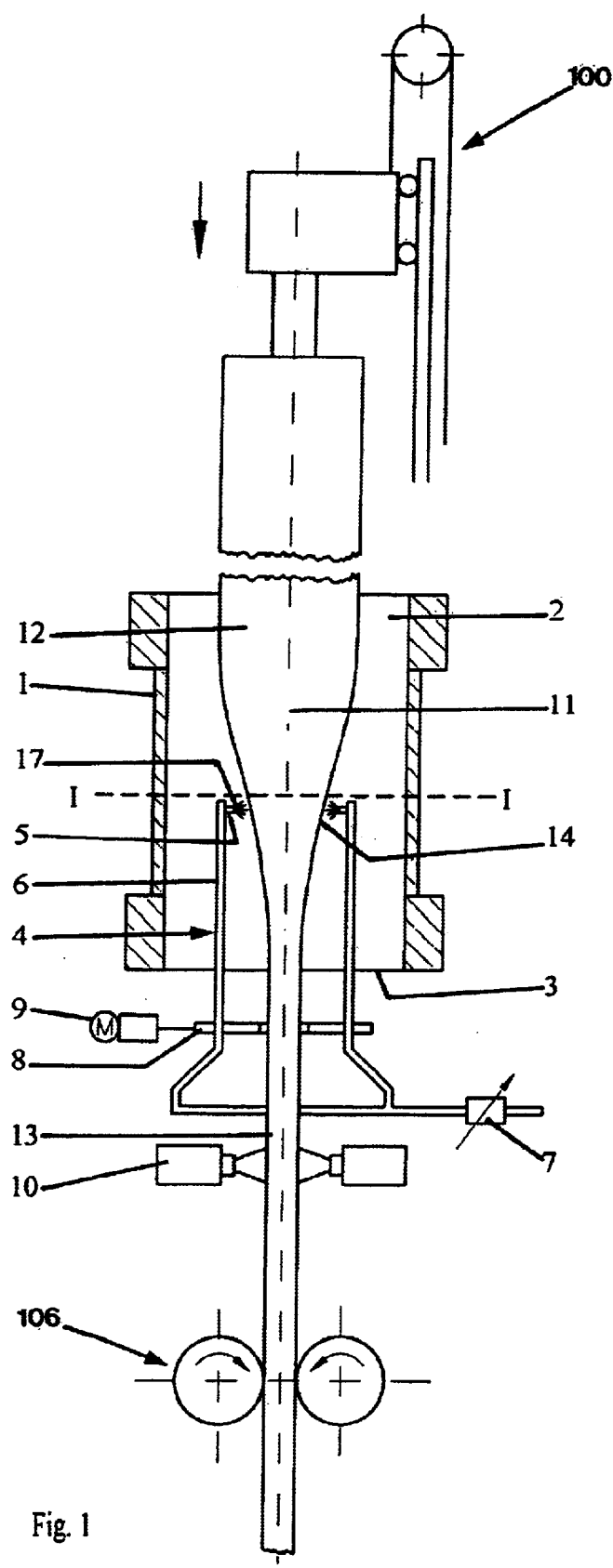
FIG. 1 is a schematic elevation view of an apparatus for drawing a rod from a cylinder by the use of gas purge lances for local cooling in the area of the drawing bulb.

Referring to FIG. 1, an electrically heated, tubular, vertically oriented furnace 1 encloses a furnace space 2 having an inside diameter of approximately 25 cm.

A gas purge lance 4 extends from bottom 3 of the furnace into furnace space 2. Gas purge lance 4 has two gas nozzles 5 facing each other inside furnace space 2; these nozzles are connected outside furnace space 2 by way of a gas feed line 6 to a controllable flow meter device 7. The components projecting into furnace space 2 such as gas nozzles 5 and gas feed line 6 consist of heat-resistant material.

Gas purge lance 4 is held by means of a positioning device 8. By means of positioning device 8, gas purge lance 4 can be shifted both in the vertical direction and also around approximately 180° of a circle around center axis 11. Positioning device 8 is connected to an automatic control device 9.

In the area below furnace space 2, a diameter measuring instrument 10 is provided, which can be pivoted around approximately 180° of a circle around center axis 11.

The process according to the invention is described in greater detail below on the basis of FIG. 1.

By means of a feed device 100, a quartz glass cylinder 12, held in a vertical orientation, is supplied continuously to furnace 1 from above. Quartz glass cylinder 12 has an outside diameter of approximately 15 cm. It is heated continuously in furnace space 2, beginning from the bottom end, to a temperature of approximately 2,200° C. By means of a take-off device 106, a rod 13 is drawn off continuously from the softened area of quartz glass cylinder 12; this rod has an outside diameter of approximately 3 cm. As rod 13 is being drawn off, a deformation zone of softened quartz glass in the form of a drawing bulb 14 develops between cylinder 12 and rod 13. In the area of drawing bulb 14, the softened quartz glass composition is plastically deformable. The location of gas nozzles 5 in the vertical direction is adjusted by means of positioning device 8 in such a way that they face each other in the area of drawing bulb 14. The distance between gas nozzles 5 and drawing bulb 14 is set at approximately 10 mm.

The cross-sectional geometry of rod 13 is determined by means of diameter measuring instrument 10, which measures the outside diameter of rod 13 around its circumference. The value and the position of an out-of-round error or of an ovality of rod 13 is determined from the maximum and minimum values for the outside diameter.

As a function of the size of the roundness deviation, the stream of cooling gas 17 emerging through gas nozzles 5 is adjusted by means of flow rate meter 7. Flow rate meter 7 and gas nozzles 5 are designed for a cooling gas flow rate of 0–20 L/min. Nitrogen is used as the cooling gas.

Simultaneously, the positioning of gas nozzles 5 around the circumference of drawing bulb 14 is automatically controlled by control device 9 on the basis of the determined location of the smallest outside diameter of the rod. The automatic control is based on the fact that the geometry of drawing bulb 14 propagates itself into rod 13. For example, in the case of an ovality of the rod cross section, gas nozzles 5 will be positioned at the point of the smallest outside diameter of the rod. They are thus located on opposite sides of the bulb on extensions of the minor axis of the oval, projected onto the zone of drawing bulb 14.

Figure 2:
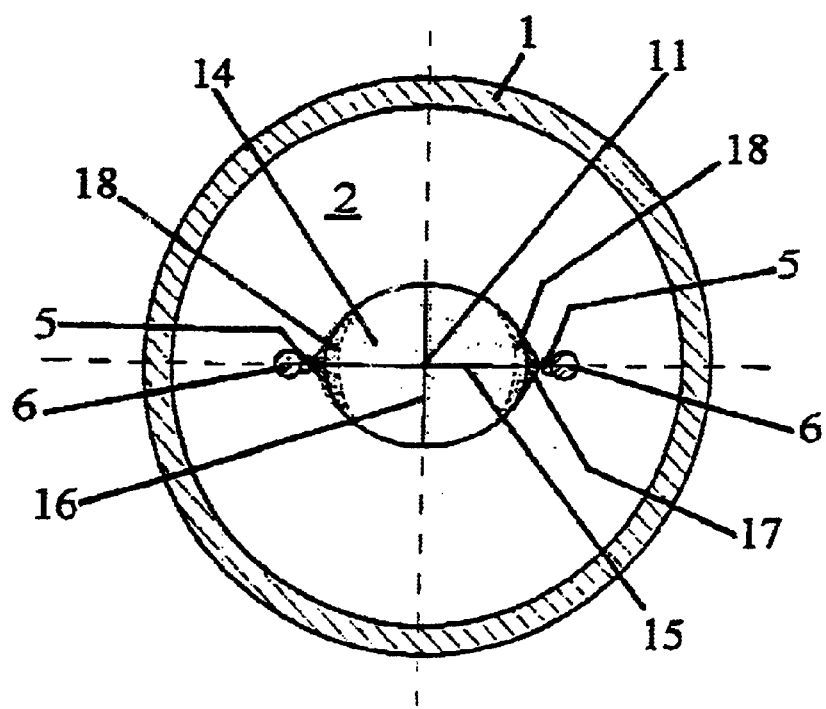
FIG. 2 is a schematic cross section showing the gas purge lances in the apparatus according to FIG. 1 in a cross section along line I—I, on an enlarged scale.

This positioning of the gas nozzles can also be seen in the cross-sectional illustration according to FIG. 2. Drawing bulb 14 has an oval cross section with major axis 15 and a minor axis 16. Gas nozzles 5 are positioned so that cooling gas stream 17 is directed primarily along minor axis 16. By means of cooling gas stream 17, drawing bulb 14 is cooled in two opposite deformation areas 18, the locations of which are indicated schematically in FIG. 2 by different types of shading in the edge areas of the oval. Thus the viscosity of the quartz glass is increased in deformation areas 18, and as a result, the ovality of drawing bulb 14 and thus the ovality of rod 13 is reduced or eliminated.

The intensity of cooling gas stream 17 is adjusted by means of flow meter 7. By increasing the flow rate of cooling gas stream 17, the desired deformation in the area of drawing bulb 14 can be achieved more quickly and more strongly. After the temporary disturbance in the drawing process has been corrected, cooling gas stream 17 can be turned off again. To compensate for permanent disturbances, such as those caused by an inhomogeneous temperature profile in furnace space 2, cooling gas stream 17 will be maintained continuously.

Figure 3:
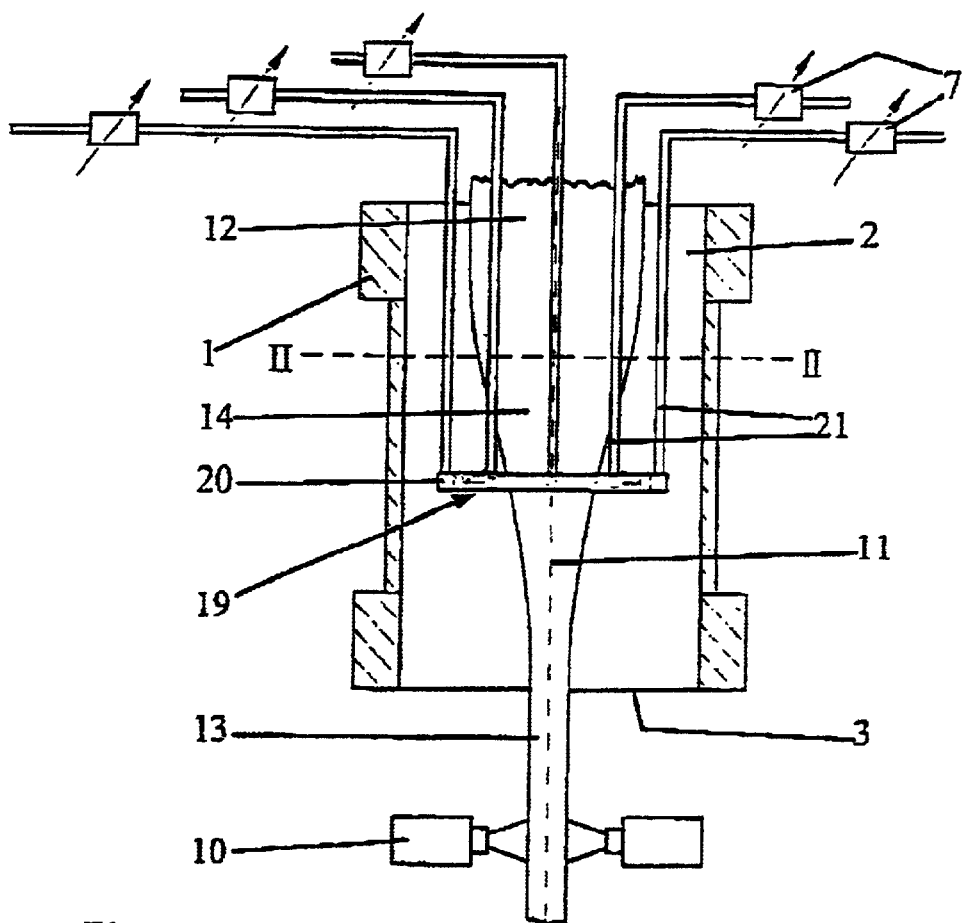
FIG. 3 is a schematic elevation view of an apparatus for drawing a rod from a cylinder using a ring of nozzles for local cooling in the area of the drawing bulb.
Figure 4:
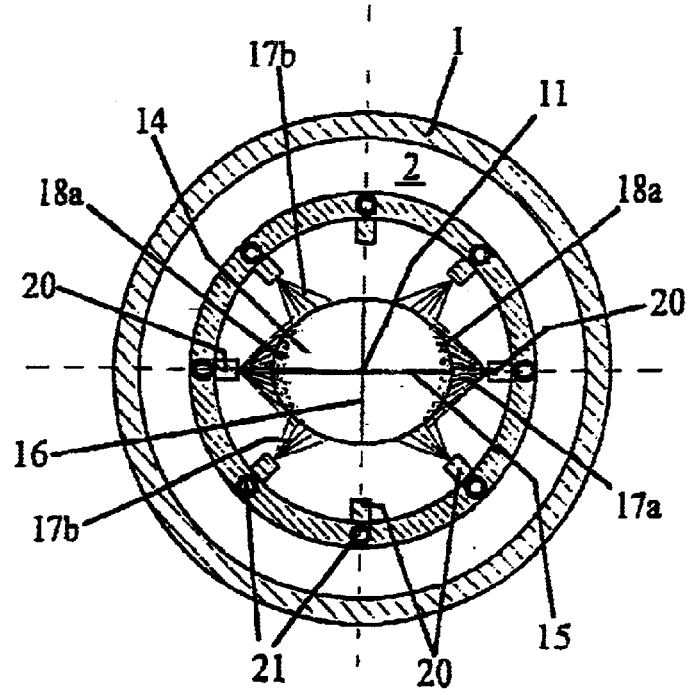
FIG. 4 is a schematic cross section showing a ring of nozzles in the apparatus according to FIG. 3 in a cross section along line II—II, on an enlarged scale.
Figure 5:
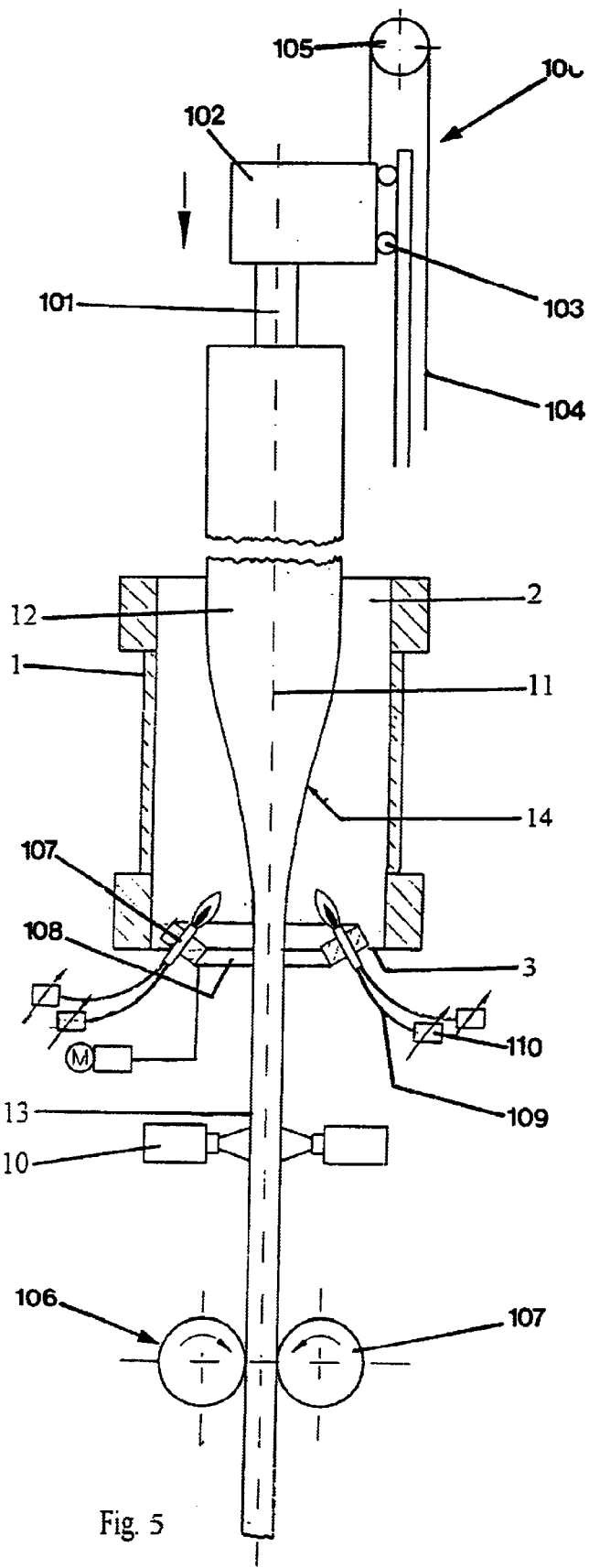
FIG. 5 shows a modification of the apparatus illustrated in FIG. 1.

Insofar as the same reference numbers used in FIGS. 3 and 4 are used in FIGS. 1 and 2, the components or parts of the apparatus according to the invention thus designated are the same or equivalent to those with the same reference numbers already explained on the basis of the embodiment according to FIGS. 1 and 2.

In the case of the embodiment of the apparatus according to the invention shown in FIG. 3, a nozzle ring 19 is provided instead of the gas purge lance. Nozzle ring 19 surrounds drawing bulb 14 with a distance of about 15 mm between the bulb and the ring. On the inside periphery of nozzle ring 19 are 8 nozzles 20 in all, distributed uniformly around the ring. These are aimed at drawing bulb 14, as can be seen in the cross-sectional view of FIG. 4. Each nozzle 20 of nozzle ring 19 can be individually controlled automatically with respect to its gas throughput. For this purpose, each nozzle 20 is provided with its own gas line 21, each line passing up and out through the top of furnace space 2. Each gas line 21 is connected to an automatically controlled gas flow meter 7. Of course, it would also be possible for gas lines 21 to pass down and out through the bottom of furnace space 2.

In the following, the process according to the invention is explained in greater detail on the basis of FIGS. 3 and 4.

By means of a feed device (not shown in FIG. 3), a quartz glass cylinder 12 held with a vertical orientation is supplied continuously to furnace 1 from above. Quartz glass cylinder 12 has an outside diameter of approximately 15 cm. It is heated continuously, beginning from the bottom end, to a temperature of approximately 2,200° C. in furnace space 2. By means of a take-off device (not shown in FIG. 3), a rod 13 is pulled continuously from the softened area of quartz glass cylinder 12. This rod has an outside diameter of approximately 3 cm. As rod 13 is being drawn away, a deformation zone of softened quartz glass in the form of a drawing bulb 14 develops between cylinder 12 and rod 13. In the area of drawing bulb 14, the softened quartz glass mass is plastically deformable. Supply speed, drawing speed, and drawing temperature are coordinated with each other in such as way that drawing bulb 14 forms in the area of nozzle ring 19, or nozzle ring 19 is positioned approximately at the middle of drawing bulb 14.

The cross-sectional geometry of rod 13 is determined by means of diameter measuring instrument 10, which measures the outside diameters of rod 13 all around its circumference. The size and the location of an out-of-round error or of an ovality of rod 13 is determined from the maximum and minimum values of the outside diameter.

The gas throughput through the individual nozzles 20 is automatically controlled as a function of the value of the roundness deviation by means of flow meter 7. Individual flow meters 7 and nozzles 20 are designed for a cooling gas flow 17a, 17b of 0–20 L/min. Helium is used as the cooling gas.

At the same time, the ratio of the gas flow rates through the individual nozzles 20 with respect to each other is determined on the basis of the detected position of the smallest outside diameter of the rod. If the cross section of the rod is oval, as illustrated in FIG. 4, main cooling gas stream 17a is produced on the side of the rod where the largest outside diameter is found. In the area of drawing bulb 14, this corresponds to an extension of major axis 15 of the drawing bulb oval. If minor axis 16 is situated between two adjacent nozzles 20, the cooling gas steam is divided between these nozzles 20 in correspondence with the ratio of their distances from minor axis 16.

For example, drawing bulb 14 has an oval cross section, as can be seen in the cross-sectional view according to FIG. 4. Main cooling gas stream 17a is thus directed along minor axis 16. In the exemplary embodiment, nozzles 20 which generate main cooling gas stream 17a are situated opposite each other, one on each side of the oval, on extensions of minor axis 16. A weaker, secondary cooling gas stream 17b is directed against the drawing bulb through adjacent nozzles 20, whereas no cooling gas at all is sent to the drawing bulb through nozzles 20 located on the extensions of major axis 15.

Cooling gas streams 17a, 17b thus cool two opposite deformation areas 18a of drawing bulb 14, the locations of which are indicated in FIG. 2 by different types of shading in the edge areas of the oval. As a result of this cooling effect, the form change explained in detail on the basis of FIGS. 1 and 2 is brought about; this means that the ovality of rod 13 is eliminated without the use of tools.

What is claimed is:

1. Process for a producing a cylindrical of glass, comprising:
    feeding a glass composition to a heating zone,
    softening the glass composition in the heating zone,
    continuously plastically deforming the softened glass composition in a deformation zone to form a component, the deformation zone having a circumference,
    determining a size and location of a deviation of a determined cross-sectional geometry from a nominal geometry of the component, and
    locally heating or cooling the composition in at least one deformation area, which extends over only a part of the circumference of the deformation zone, wherein said local heating and cooling is performed automatically as a function of the deviation of the determined cross-sectional geometry from the nominal geometry.

2. Process as in claim 1, wherein the deformation area is locally directing a stream of gas against the composition.

3. Process as in claim 1, wherein the deformation area is locally heated by means of a furnace.

4. Process as in claim 1, wherein said deformation area is locally cooled by means for shielding heat from the deformation area.

5. Process as in claim 1, wherein the composition is locally heated or cooled in two opposed deformation areas.

6. Process as in claim 1, further comprising
    determining a change in the cross-sectional geometry of said component over time, and
    shifting at least one said deformation area around the circumference of said deformation zone as a function of the determined change over time in the cross-sectional geometry of the component.

7. Process as in claim 1, wherein said component has a circular or annular cross-section with an outside diameter, the cross-sectional geometry is determined by measuring said outside diameter to determine maximum and minimum values, a size value and a location value of the deviation are determined from the maximum and minimum measurement values, quantitative heating or cooling is performed as a function of the size value, and the deformation area is positioned as a function of the location value.

8. Process as in claim 1, wherein the softened glass composition is drawing said composition in a drawing direction so that said composition tapers in the drawing direction toward the component.

9. Apparatus for producing a cylindrical component of glass, said apparatus comprising a feed device, a heating device, and a take-off device, where a glass composition is fed continuously by the feed device to the heating device, in which it is softened, and where the component is formed out of the softened glass composition by means of the take-off device in a deformation zone, further comprising at least one of heating and cooling means which act locally on at least one deformation area, which extends over only part of the circumference of the deformation zone, and wherein the heating and cooling means are connected to an automatic control device and, as a function of a control signal from a control device, these can be moved in the direction of the longitudinal axis of the component and adjusted in a circumferential direction around the deformation zone.

10. Apparatus according to claim 9, wherein the cooling means comprise a gas nozzle.

11. Apparatus according to claim 9, wherein the heating means comprises a furnace.

12. Apparatus according to claim 9, wherein the at least one of a heating and cooling means comprise pairs of opposing elements.

13. Apparatus according to claim 12, wherein the cooling means comprises two nozzles arranged opposite each other.

14. Apparatus according to claim 9, wherein the cooling means have a nozzle ring arranged around the circumference of the deformation zone, the ring comprising individual nozzles which are fed with gas independently.

15. Apparatus according to claim 9, wherein the at least one of heating and cooling means are arranged inside the heating device.

16. Apparatus according 9, wherein the cooling means comprises means for shielding heat from the deformation zone.

* * * * *